United States Patent [19]
Florindez

[11] Patent Number: 6,065,392
[45] Date of Patent: May 23, 2000

[54] APPARATUS FOR MANUFACTURING DIFFERENT SHAPED BAKERY PRODUCTS

[76] Inventor: Augusto Florindez, 13029 Ocaso Ave., La Mirada, Calif. 90638

[21] Appl. No.: 09/156,223

[22] Filed: Sep. 18, 1998

[51] Int. Cl.[7] ............................. A47J 27/00; B65B 35/46; B65G 47/29
[52] U.S. Cl. ............................. 99/353; 99/427; 99/443 C; 198/464.2; 425/186; 425/367
[58] Field of Search ................................ 99/334, 352–355, 99/426, 427, 400, 443 R, 443 C, 485, 495, 450.1, 450.2; 53/246, 251, 534, 539, 505; 198/690.1, 464.2, 464.3; 221/266; 425/186, 190, 297, 307, 311, 336, 367, 369; 426/502, 512, 496

[56] References Cited

U.S. PATENT DOCUMENTS

| | | | |
|---|---|---|---|
| 2,837,942 | 6/1958 | Laval, Jr. | 99/494 |
| 3,716,383 | 2/1973 | Yamamura | 99/353 |
| 3,954,204 | 5/1976 | Becker | 221/266 X |
| 4,051,772 | 10/1977 | Johansson et al. | 99/427 |
| 4,308,974 | 1/1982 | Jones | 221/266 |
| 4,329,920 | 5/1982 | Rose et al. | 99/450.1 |
| 4,448,116 | 5/1984 | Muzzarelli | 99/494 |
| 4,668,524 | 5/1987 | Kirkpatrick | 99/353 |
| 4,815,959 | 3/1989 | Stoeckli et al. | 99/353 |
| 4,945,825 | 8/1990 | Florindez | 99/427 |
| 5,033,367 | 7/1991 | Florindez | 99/353 |
| 5,060,562 | 10/1991 | Florindez | 99/353 |
| 5,476,035 | 12/1995 | Florindez | 99/443 C |

*Primary Examiner*—Timothy Simone
*Attorney, Agent, or Firm*—Connors & Assoc.; John F. Connors

[57] ABSTRACT

Apparatus (10) for manufacturing different shaped bakery products, such as hamburger and hot dog buns, includes a dough packet feeder (18) which advances to an exit station (22) in a step-wise manner rows of dough packets having a first shape. A roller gate (20) positioned at the exit station (22) to receive the rows of dough packets exiting the dough packet feeder (18) includes a first roller member (20a) having three rows of receptacles (20b) spaced apart from each other 120° and each sized to receive an individual dough packet having the first shape. A bakery pan indexing feeder (26) advances in a step-wise manner bakery pans (60) or (62) into which the dough packets are deposited by a moving carrier member (52) positioned between the roller gate (20) and the bakery pan indexing feeder (26). The moving carrier member (52) has a receiving end onto which the rows of dough packets are deposited after leaving the roller gate (20) and an exit end where the dough packets leave the moving carrier member. A moveable pressure mechanism (76) is selectably moved into position adjacent the moving carrier member (52) to form the dough packets into a second shape when the second shaped bakery product is to be made

7 Claims, 5 Drawing Sheets

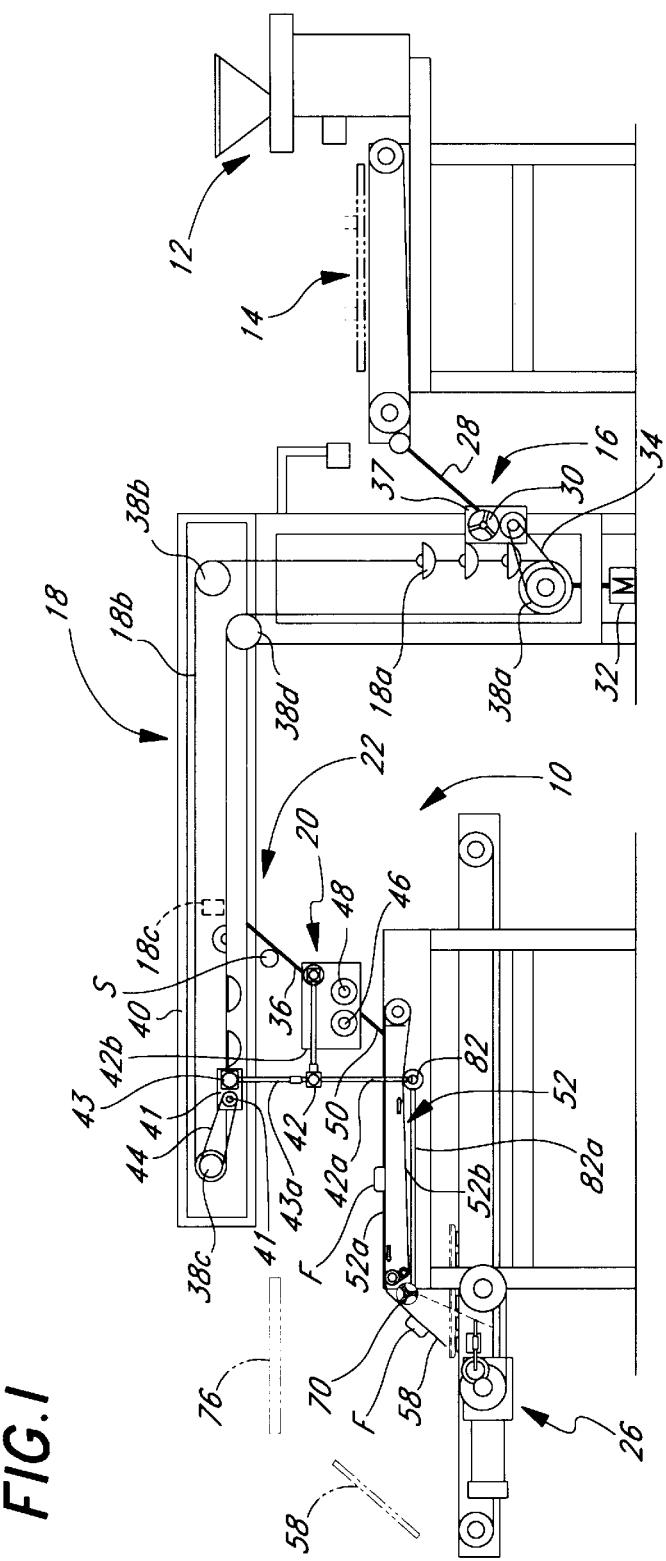
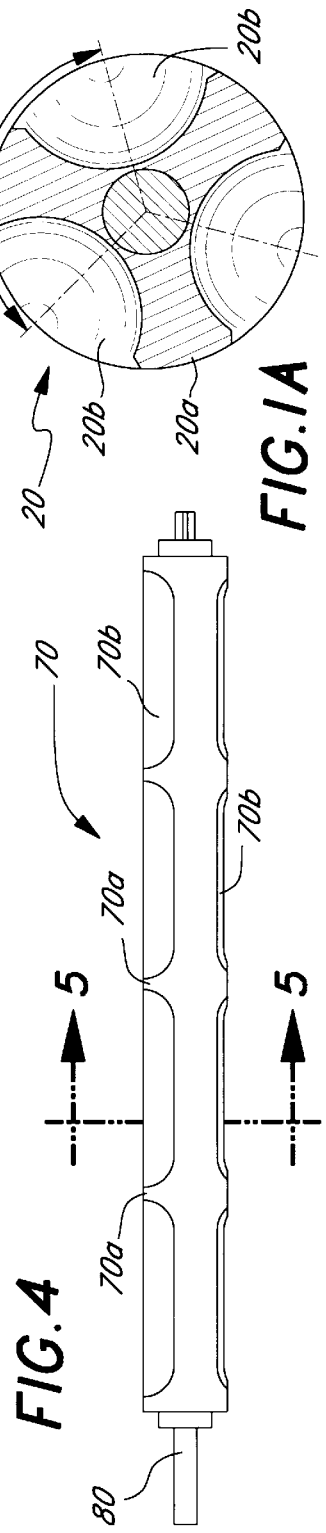
FIG. 1
FIG. 1A
FIG. 4

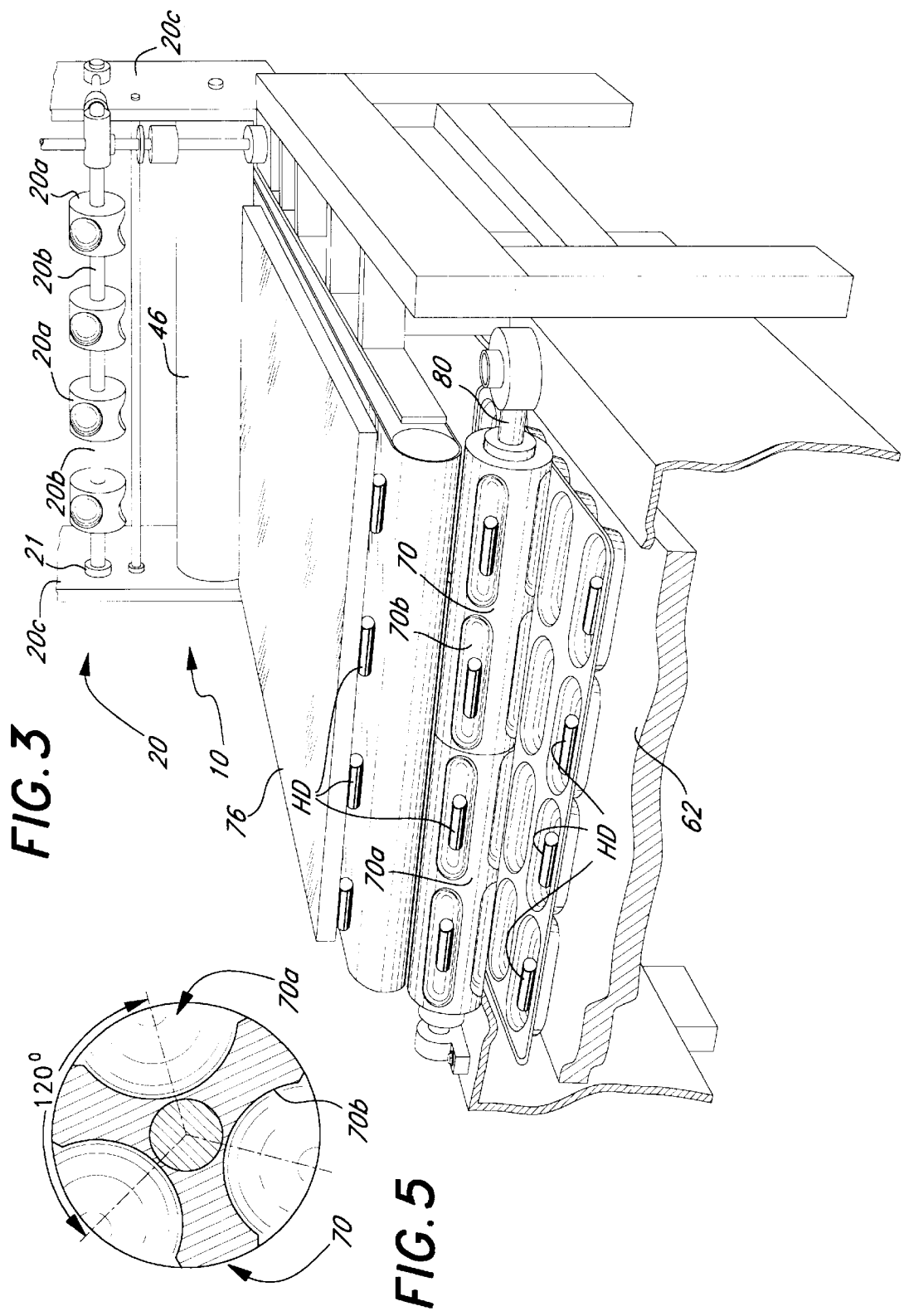

APPARATUS FOR MANUFACTURING DIFFERENT SHAPED BAKERY PRODUCTS

BACKGROUND OF THE INVENTION

1. Field of the Invention

This invention relates to an apparatus for manufacturing different shaped bakery products, in particular, bakery products such as hamburger buns and hot dog buns.

2. Background Discussion

In the manufacture of bakery products such as hamburger buns and hot dog buns, dough packets of a spherical configuration are fed by a feeder known as a tray proofer to an exit station where rows of dough packets are deposited row by row into a feeder known as a sheeter. The sheeter deposits the dough packets row by row on a moving belt which extends over a molder table. Typically, the spherical dough packets are first flattened by passing then through the nip of a pair of rollers in the sheeter. The gap at the nip of the rollers may be adjusted depending on the type of bakery product being made. For example, if hot dog buns are being made, the distance between the sheeter rollers is greater than when hamburger buns are being made. The flattened dough packets fall off the molder table into bakery pans having rows of individual pockets into which the individual, dough packets are deposited row by row.

U.S. Pat. No. 5,476,035 discloses a bakery pan indexing apparatus for advancing bakery pans in a stepwise fashion past the point where the individual dough packets are deposited row by row into individual pockets of the advancing bakery pans. A rounder device forms the spherical dough packets which are then fed to the tray proofer. U.S. Pat. No. 5,060,562 discloses a rotary indexing machine which feeds rows of dough packets from the rounder device to the tray proofer using a roller with rows of receptacles spaced apart 120°. The receptacles in this indexer roller are cupped or hemispherical in shape and are unsuited for carrying cylindrical shaped dough packets used in making hot dog buns.

When making hot dog buns, the spherical dough packets from the sheeter are rolled up into a generally cylindrical configuration using a pressure board which is positioned above the molder table. As the flattened dough packets from the sheeter are advanced over the molder table by the moving belt, they are rolled up into a cylindrical configuration as they pass between a gap between the pressure board and the molder table. These cylindrical shaped dough packets are forwarded by the moving belt to a pan having an elongated pocket sized to receive the cylindrical shaped dough packets falling off the molder table.

A problem encountered in making both hamburger and hot dog buns is that individual packets in a row of the dough packets do not always stay in alignment as they move from the tray proofer to sheeter and across the molder table. This results in slow down of production and waste of materials. Moreover, the equipment currently employed does not easily lend itself to the manufacture of different types of bakery products. It would be desirable to provide one apparatus which by a simple modification or rearrangement of its components enable it to manufacture both hamburger buns and hot dog buns. It would also be desirable for such equipment to either avoid or compensate for the misalignment of the individual dough packets that some times occurs in the rows of dough packets. In current equipment, swinging or bomb-bay type door gates are frequently used to control the feeding of rows of dough packets between different operations of the manufacturing equipment. These doors are dangerous, since workers may be injured if they accidentally catch their fingers, hands or other part of their bodies in the doors as they close. Using such doors for controlling the feeding of the rows of dough packets also limits the speed of the manufacturing equipment.

SUMMARY OF THE INVENTION

It is the objective of this invention to provide an apparatus which by a simple modification or rearrangement of its components enable it to manufacture both hamburger buns and hot dog buns and also either avoids or compensates for misaligned rows of dough packets.

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include, but are not limited to, providing an apparatus which may be conveniently and easily used to the maximum extent possible conventional equipment which is modified only slightly to make different types of bakery products, which avoids or compensates for individually misaligned packets in a row of dough packets, and which provides improved speed and safety.

The first feature of the apparatus of this invention for manufacturing different shaped bakery products is that it includes a first roller member positioned at an exit station to receive rows of dough packets. Typically, a dough packet feeder such as a tray proofer advances rows of substantially spherical shaped dough packets to the exit station. The first roller member has three rows of receptacles spaced apart from each other 120°. Each receptacle is sized to receive an individual dough packet having a first shape, for example, substantially spherical which are subsequently flatten into a disk shape for making hamburger buns. Preferably, the first roller member comprises a plurality of individual sections manually moveable laterally, each section having three receptacles therein each spaced apart from each other 120°.

The second feature is a moving carrier member positioned near the first roller member and having a receiving end which receives the rows dough packets after leaving the first roller member and an exit end where the dough packets leave the moving carrier member. Usually, a table is positioned between the first roller member and a bakery pan indexing feeder. An endless belt surrounds the table and it has an upper flight above the top of the table with a receiving end onto which the rows of flattened dough packets are deposited upon leaving a flattening roller mechanism and an exit end from which fall the dough packets carried by the moving carrier member.

The third feature is a pressure mechanism positioned adjacent the moving carrier member to form the dough packets into a second shape, for example, substantially cylindrical shape for making hot dog buns. This pressure mechanism is moveable between an inoperable and operable position. Typically, it comprises a conventional pressure board with rectangular tunnels therein which is positioned near the surface of the upper flight of the belt above the table and is inclined slightly to provide a gap between the upper flight of the belt (or the table top) and the board. This gap becomes narrower as the dough packets advance between the gap. Different boards are used depending on the size and shape of the hot dog bun being made.

The fourth feature is second roller member having three rows of receptacles spaced apart from each other 120°. Each receptacle is sized to receive an individual second shaped dough packet. There is a ramp having an operable position which directs dough packets falling from the belt into pans being advanced by a pan indexer feeder when bakery products of a first shape are being made, for example, hamburger buns. This ramp is moveable to an inoperable position which exposes the second roller member when making bakery products of another shape, for example, hot dog buns.

The fifth feature is a drive mechanism for rotating the first and second roller members synchronously in a step wise manner to rotate the first and second roller members through a 120° turn each time a row of dough packets is being advanced. Alternately, the first and second roller members may be disengaged, for example, by means of a clutch, when the first shaped bakery product is being made. It is only important that the first and second roller members are rotated synchronously in a step wise manner when the second product is being made. The number of receptacles in the first and second roller members is equal to the number of spherical shaped dough packets in a single row of dough packets being advanced.

DESCRIPTION OF THE DRAWING

The preferred embodiments of this invention, illustrating all its features, will now be discussed in detail. These embodiments depict the novel and non-obvious apparatus of this invention for manufacturing different shaped bakery products as shown in the accompanying drawing, which is for illustrative purposes only. This drawing includes the following figures (FIGS.), with like numerals indicating like parts:

FIG. 1 is a schematic drawing of the apparatus of this invention for manufacturing different shaped bakery product.

FIG. 1A is a cross-sectional view of one element of the sheeter roller gate of this invention.

FIG. 3 is a prospective view of the apparatus of this invention for manufacturing different shaped bakery product with its components arranged to manufacture hot dog buns.

FIG. 4 is a side elevational view of a roller member used to make hot dog buns

FIG. 5 is a cross sectional view taken along 5—5 of FIG. 4

DETAILED DESCRIPTION OF THE PREFERRED EMBODIMENTS

Figure 2:
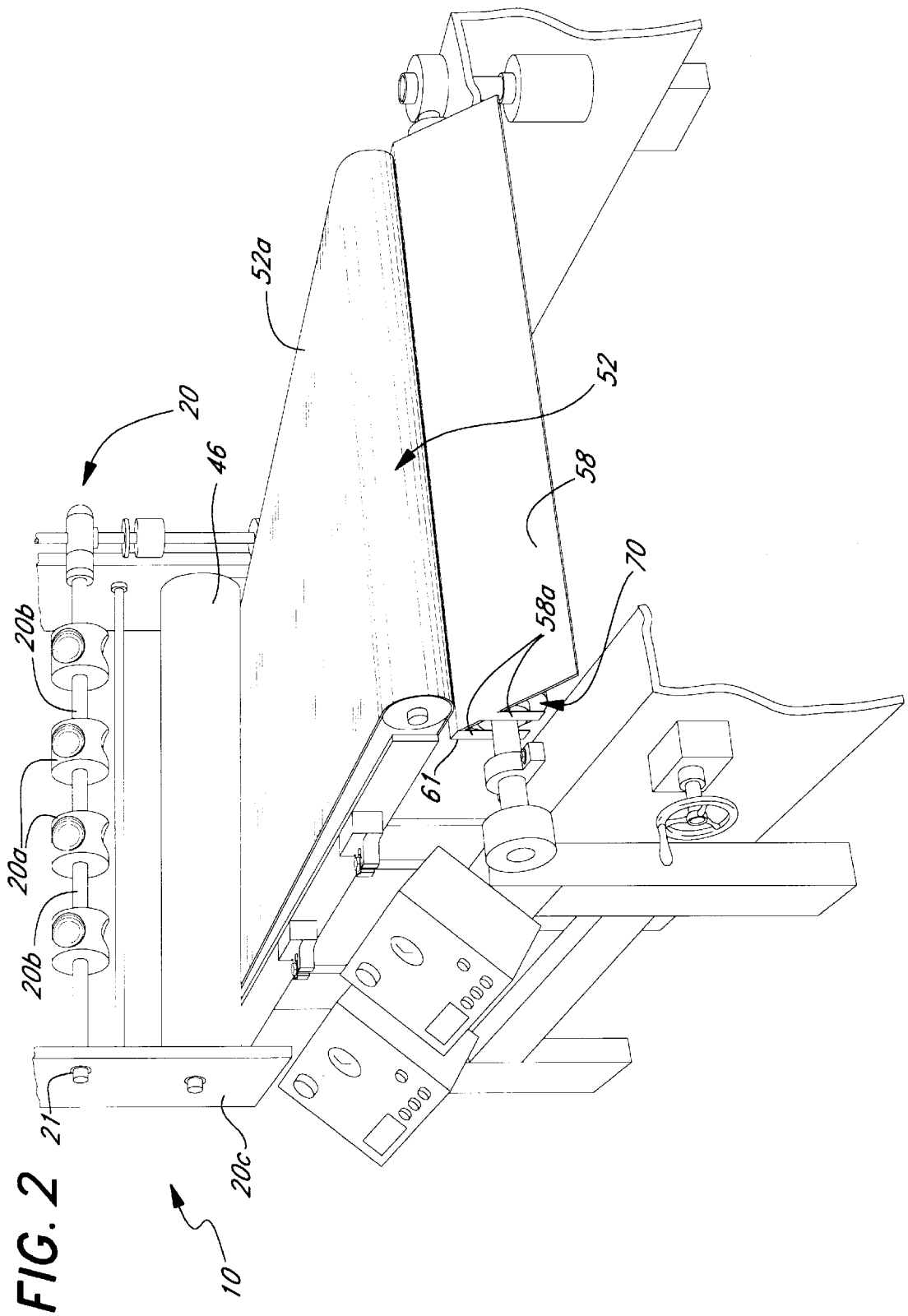
FIG. 2 is a prospective view of the apparatus of this invention for manufacturing different shaped bakery products with its components arranged to manufacture hamburger buns.

As best illustrated in FIGS. 1 through 3, the apparatus 10 of this invention for manufacturing different shaped bakery products includes a dough divider 12, a rounder 14, a rotary gate indexer 16, a tray proofer 18, a sheeter roller gate 20 positioned at the exit station 22 of the tray proofer, a molder table 24, and a bakery pan indexer 26. The apparatus 10 is designed to move rows of dough packets through it sometimes in a step wise manner other time in a continuous manner. Dough packets which are spherical are designate by the letter "S," dough packets which are flattened are designate by letter "F," and dough packets which are formed into cylinders for hot dog buns are designate by letters "HD."

In accordance with conventional practice, the dough divider 12 cuts and weights dough packets so that they are essentially of equal weight and the rounder forms the individual packets into balls or spheres which roll or slide down a ramp 28 row by row to the rotary gate indexer 16 disclosed in U.S. Pat. No. 5,060,562, which is incorporated herein by reference and made a part of this application. Because the dough packets are in rows as they slide down the ramp 28, individual dough packets are deposited in individual receptacles (not shown) in a roller 30 in the rotary gate indexer 16. The receptacles in the roller 30 are in rows which are spaced apart 120° from each other and the dough packets are aligned in rows and are deposited row by row into these receptacles as the roller 30 rotates in a step wise manner 120°. A motor 32 through a drive sprocket system 34 and a conventional indexer box 37 drives the roller 30. The roller 30, as it rotates in increments of 120° turns, deposits the dough packets row by row into rows of trays 18a in the tray proofer 18. These rows of proofer trays 18a are carried by an endless belt 18b which extends around a series of rollers 38a, 38b, 38c, and 38d. This endless belt 18b is moved continuously, rather than in a stepwise manner, by the motor 32 and rollers 38a, 38b, 38c, and 38d past the exit station 22 of the tray proofer 18. At the exit station 22 the rows of trays 18a are inverted row by row by a flipper 18c, causing the spherical dough pockets falling from the trays to roll or slide down a ramp 36 to the sheeter roller gate 20 positioned below the exit station.

As best depicted in FIGS. 1A, 2 and 3, this sheeter roller gate 20 comprises a series of roller elements 20a slideably mounted on rigid bars 20b extending between a pair of opposed end plates 20c mounted in bearings 21 so that the entire assembly may be rotated. Slideably mounting individual roller elements 20a on the bars 20b enables each individual roller element 20a to be manually moved laterally as required to align each roller element with respect to the individual dough pockets in the rows of packets sliding down the ramp 36. This is desirable because different shaped bakery products require the spacing between individual packets in a row of dough packets to be spaced apart different distances. For example, one size hot bun will require the spacing between individual packets in a row of dough packets to be greater than for another size hot bun. In the embodiment disclosed, there are four dough pockets in a row so four roller elements 20a are employed. It is also common, however, to have 6 or 8 dough pockets in a row. The number of roller elements 20a employed always equals the number of dough packets in a row of packets.

As depicted in FIG. 1A, each roller element 20a includes a hemispherical receptacle 20c sized to receive an individual dough packet and each receptacle on each roller element is spaced 120° from an adjacent receptacle. When mounted on the bars 20b, the receptacles 20b in adjacent roller elements 20a are aligned with each other to provide a row of adjacent receptacles equal in number to the number of packets in a row of dough packets sliding down the ramp 36. In other words, the number of roller elements 20a in a row of elements, or the number of aligned receptacles in a row of roller elements, equals the number of dough pockets sliding down the ramp 36 to the sheeter roller gate 20.

The sheeter roller gate 20 is coupled to the roller 38c by a pulley or sprocket 44, a conventional indexer box 41, and pair of angle gear boxes 40 and 42 so this sheeter roller gate 20 rotates incrementally in a stepwise fashion. (Both the conventional indexer boxes 37 and 41 could be replaced by a stepper motor or other equivalent drives to covert the continuous motion of the motor 32 into a stepwise motion). The output shaft from the indexer box 41 is connected to an angle gear box 43 which has a linkage 43*a* connected to the angle gear box 42. The linkages 42*a* and 42*b* are connected, respectively, to the angle gear box 82 and sheeter roller gate 20. A linkage from the angle gear box 82 is connected to a hot dog bun roller gate 70. The stepwise movement of the sheeter roller gate 20 is in synchronization with the rows of dough packets falling from the exit station 22. As the sheeter roller gate 20 is rotated through a 120° turn with the roller elements 20*a* moving as a unit, the dough pockets in the receptacles 20*b* in one row fall from the roller gate 20 into the nip of a pair of sheeter rollers 46 and 48 and another row of receptacles 20*b* moves into position to collect the next row of dough packets sliding down the ramp 36. The sheeter rollers 46 and 48 are conventionally mounted to be adjustable and may be moved relative to each other to regulate the spacing between the nip of these rollers so that the dough pockets may be flattened to a greater or lesser degree as desired. Typically, when hamburger buns are being made, the dough pockets are flatten more than when making hot dog buns.

Figure 7:
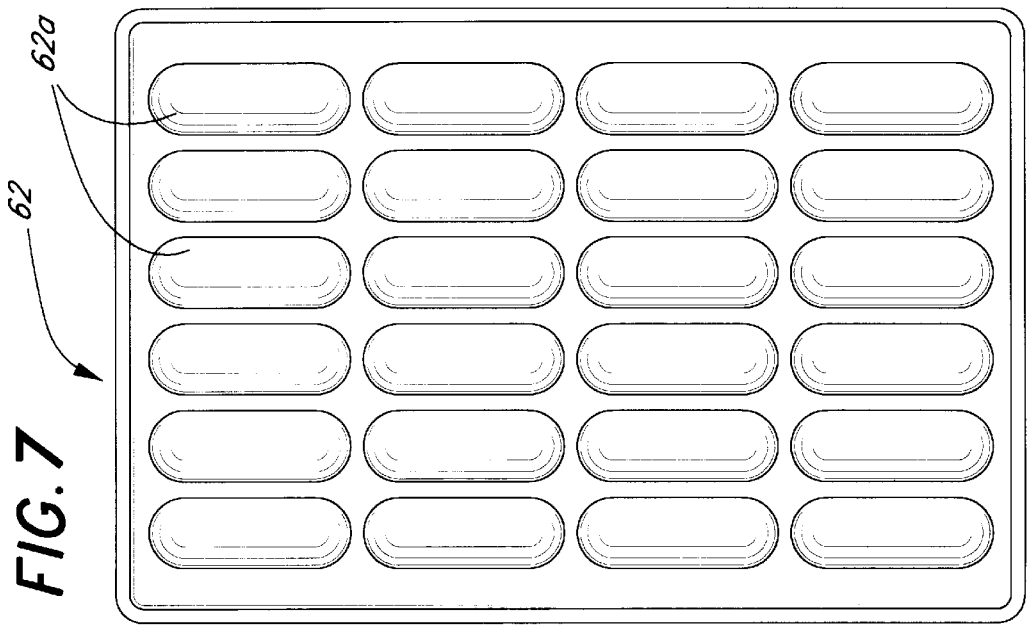
FIG. 7 is a plan view of a pan used to manufacture hot dog buns.
Figure 6:
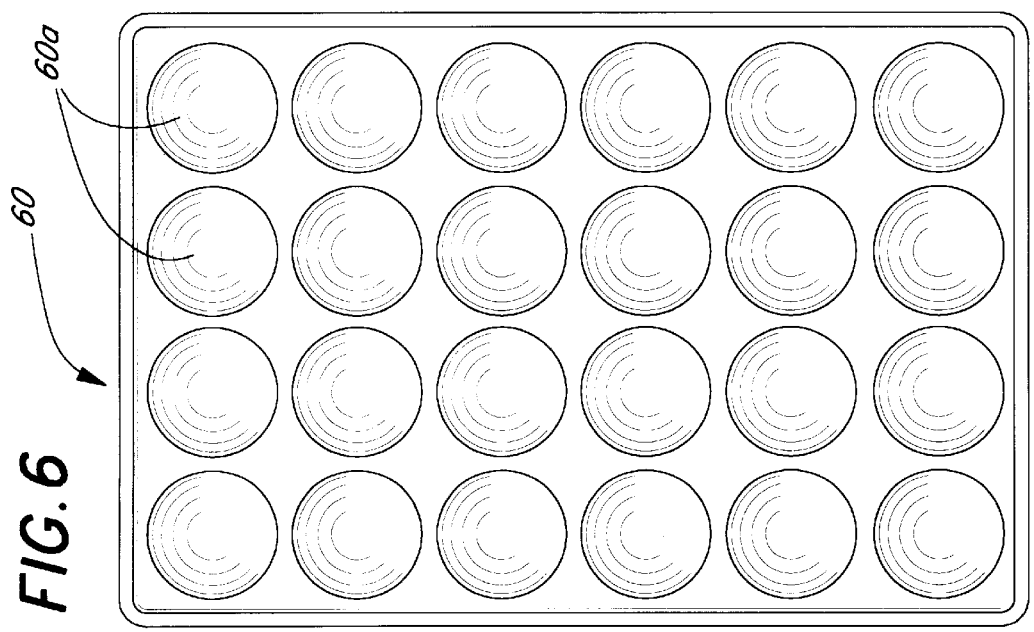
FIG. 6 is a plan view of a pan used in the manufacture of hamburger buns.

As the dough pockets pass row by row through the nip of the sheeter rollers 46 and 48, they roll or slide down another ramp 50 onto a continuously moving endless belt 52 that surrounds the molder table 24. This belt 52 has one flight 52*a* above the molder table 24 and another flight 52*b* below the table. The rows of dough packets leaving the rollers 46 and 48 land on one end of the flight 52*a* adjacent these rollers and then are carried by this flight to its exit end which is near the bakery pan indexer 26 disclosed in U.S. Pat. No. 5,476,035, which is incorporated herein by reference and made a part of this application. The sheeter rollers 46 and 48 may be independently driven, or are driven by a common motor (not shown), and they are moved continuously. The dough pockets fall row by row onto the receiving end of the flight 52*a* of the belt 52 and are moved by this belt to the exit end of the flight 52*a* where they slide down another ramp 58 into individual pockets of a pan being advanced by the bakery pan indexer 26. When hamburger buns are being made the pan 60 (FIG. 6) is used, and when hot dog buns are being made, the pan 62 (FIG. 7) is used. The selected pans 60 or 62, as the case may be, are positioned on the bakery pan indexer 26 so that the rows of pockets 60*a* and 62*a*, respectively, in pans 60 and 62, are oriented four pockets abreast. Thus, the number of pockets in the pans 60 or 62 aligned abreast equals the number (4) of packets in the row of dough packets illustrated. If there were more than four packets in a row of dough packets being processed, then different pans would be employed having a number of pockets arranged abreast in the pans equal to the number of packets in a row of dough packets. The bakery pan indexer 26 moves the pans 60 or 62 in synchronization with the dough packet falling from the belt 52, so that the pans 60 or 62, as the case may be, are advanced in a stepwise fashion timed to collect the dough packets falling row by row from the ramp 58, with individual dough packets being deposited into individual pockets 60*a* or 62*a*, as the case may be.

As best depicted in FIG. 3, positioned immediately below the ramp 58 is the hot dog bun indexer roller gate 70. This indexer roller gate 70 comprises a pair of roller elements 70*a* mounted on a common shaft 80. As shown in FIG. 4, each roller element 70*a* has three rows of two receptacles 70*b* per row, with each row of receptacles spaced 120° apart from each other. With the pair of roller elements 70*a* mounted on a common shaft 80, there is provided three 120° spaced apart rows containing four aligned receptacles 70*b* in each row. These receptacles 70*b* are of a different configuration than the receptacles 20*b* in the sheeter roller gate 20. They are elongated and semi-cylindrical so that they are adapted to receive and retain a cylindrical dough packet for making a hot dog bun.

The ramp 58 is removably mounted by fingers 58*a* on brackets 61 which enables the ramp to be removed, thereby no longer being operable, to expose the pan indexer roller gate 70. The inoperable position of the ramp 58 is illustrated in dotted lines in FIG. 1. For example, the ramp 58 may simply be set aside when hot dog buns are being made. With the ramp 58 in its inoperable position, a pressure board 76 is manually moved from an inoperable position shown in dotted lines in FIG. 1 to an operable position, as shown in FIG. 3, immediately above the molder table nearby the surface of the flight 52*a* of the belt 52. The apparatus 10 is now configured to make hot dog buns. Typically, the position of the sheeter rollers 46 and 48 is also adjusted so that the dough packets from the sheeter roller gate 20 for hot dog buns are thicker than when hamburger buns are being made.

As the rows of thicker, flattened dough pockets are carried by the belt 52, they move through a narrow gap between the pressure board 76 and the top of the molder table 24. This gap is about from ⅜ to about ¾ inch high. The pressure board 76 is at an incline so that the gap is narrower near the pan indexer 26 than near the ramp 50. As the dough packets move through this gap, they are squeezed, elongated and rolled into a substantially cylindrical configuration as they are advanced to the exit end of the flight 52*a* of the belt 52. Upon reaching the exit end of the flight 52*a*, the individual, cylindrically shaped dough packets fall row by row into individual receptacles 70*b* in the hot dog bun indexer roller gate 70. This indexer roller gate 70 is turned in 120° increments in a stepwise manner synchronously with the sheeter roller gate 20 because it is linked by an angle gear box 82 to the angle gear boxes 40 and 42. (When not being used, hot dog bun indexer roller gate 70 may be disengaged by a clutch not shown.) Thus, with each stepwise advance, the sheeter roller gate 20 feeds a row of spherical dough packets to the sheeter rollers 46 and 48. Upon passing through the sheeter rollers 46 and 48, the dough packets are advanced by the belt 52 past the pressure board 76 to form the packets into a substantially cylindrical configuration. These rows of cylindrical packets fall off the belt 52 into the receptacles 70*b* of the hot dog bun indexer roller gate 70 which in turn deposits the dough packets row by row into individual pockets 62*a* the pan 62.

To reconfigure the apparatus 10 to make hamburger buns, the pressure board 76 is manually moved to the inoperable position shown in dotted lines in FIG. 1 and the ramp 58 is repositioned in its operable position shown in FIGS. 1 and 2. The spacing of the sheeter rollers 46 and 48 may also be adjusted for this change and the roller elements 20*a* of the sheeter roller gate may be moved laterally as required to make hamburger buns.

As mentioned above, the rows of dough packets sometimes become misaligned as they are advanced from the tray proofer 18 to the molder table 24 to the pan indexer 26. Due to the sheeter roller gate 20 and the hot dog bun indexer roller gate 70, this misalignment is compensated for when the dough packets are received in the receptacles 20*b* and 70*b* of these roller gates. Moreover, with the sheeter roller gate 20 and hot dog bun indexer roller gate 70 replacing conventional swinging or bomb-bay doors for controlling the feeding of the dough packets through the apparatus 10, the speed of the apparatus is increased. For example conventional equipment using such swinging or bomb-bay doors has a speed of about 125 cycles per minute whereas the same equipment with the swinging or bomb-bay doors replaced by the sheeter roller gate 20 and hot dog bun indexer roller gate 70 speeds of 150 cycles per minute may be attained.

ALTERNATE EMBODIMENT

Figure 8:
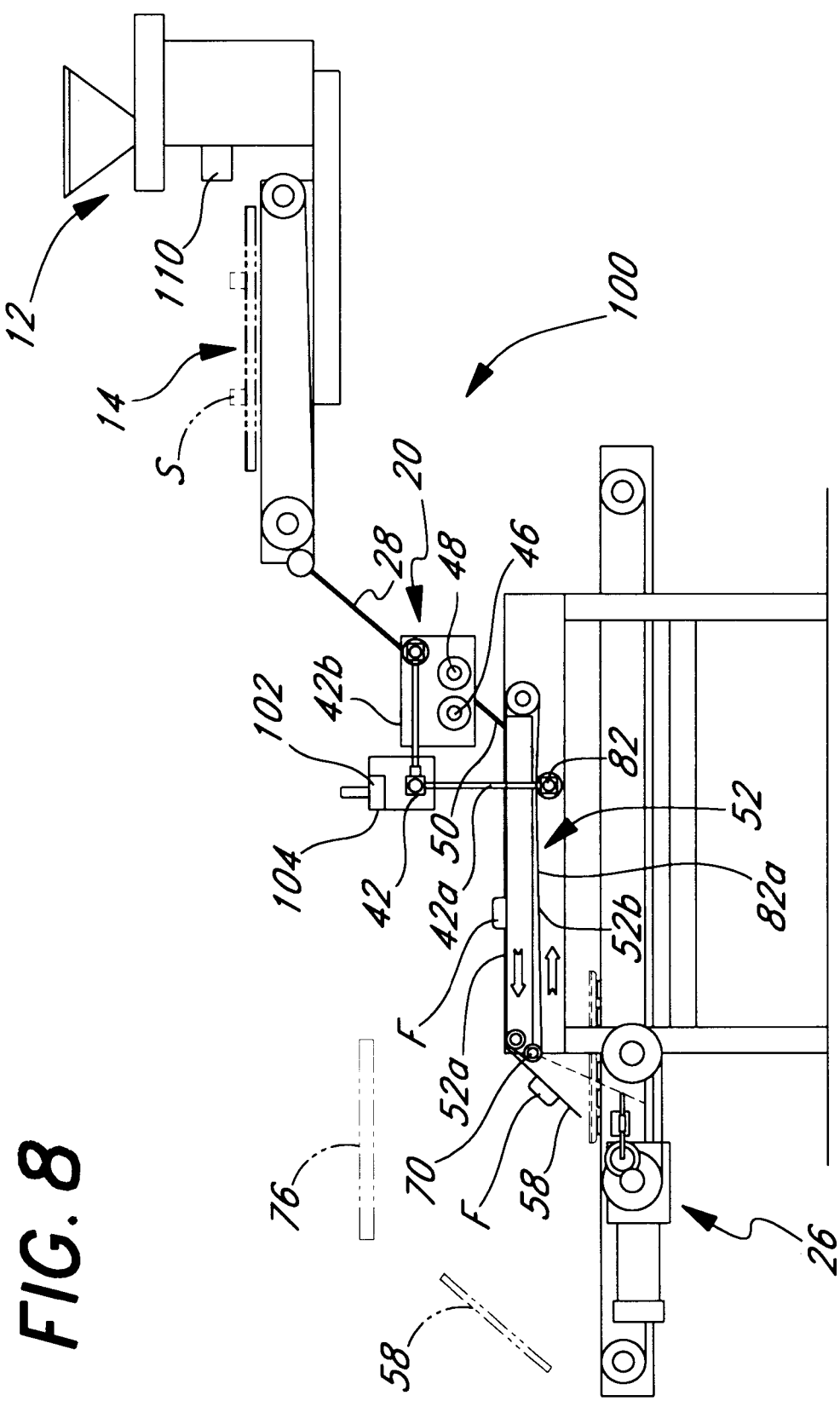
FIG. 8 is a schematic drawing of an alternate embodiment of the apparatus of this invention for manufacturing different shaped bakery product which eliminates the proofer tray.

An alternate embodiment of this invention, the apparatus 100 shown in FIG. 8, is similar to apparatus 10, except that the proofer tray 18 and its associated drives are eliminated. In the apparatus 100, the ramp 28 from the rounder 14 feeds directly into the sheeter roller gate 20. The sheeter roller gate 20 is now driven in a stepwise manner by a slave variable speed gear motor 102 through a conventional indexer box 104 that has its output shaft connected to the angle gear box 42. The motor 102 through the indexer box 104, and angle gear boxes 42 and 82, and there linkages 42a, 42b, and 82a, drive the hot dog bun indexer roller gate 70. The drive for a knife (not shown) which cuts the dough into dough packets S is equipped with a master encoder 110. There is an electronic linkage between the master encoder 110 and the slave variable speed gear motor 102. Thus, the motor 102 and drive for a knife are in synchronization. In the apparatus 100, the dough packets S fall from the ramp 28 directly into the sheeter roller gate 20. Although in this embodiment, the apparatus 100 is designed to manufacture both hamburger and hot dog buns, it would be possible to eliminate the hot dog bun roller gate 70.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

I claim:

1. Apparatus for manufacturing different shaped bakery products, including
   a dough packet feeder which advances rows of substantially spherical shaped dough packets to an exit station,
   a roller gate positioned at the exit station to receive the rows of substantially spherical shaped dough packets exiting the dough packet feeder,
   said roller gate including a first roller member having three rows of receptacles spaced apart from each other 120°, each receptacle sized to receive an individual substantially spherical shaped dough packet,
   a flattening roller mechanism positioned to receive the substantially spherical shaped dough packets which fall from the first roller member as said first roller member is rotated,
   a bakery pan indexing feeder which advances in a stepwise manner bakery pans,
   a table positioned between the roller gate and the bakery pan indexing feeder having a moving carrier member with a receiving end onto which the rows of flattened dough packets are deposited upon leaving the flattening roller mechanism and an exit end from which fall the dough packets carried by the moving carrier member,
   a moveable pressure board having a first inoperable position and a second operable position above the table to provide a narrow gap through which the flattened dough packets pass to form the flattened dough packets into substantially cylindrical shaped dough packets,
   a ramp member moveable between a first operable position at the exit end of the moving carrier member where said ramp member directs the dough packets falling from the table into bakery pans carried by the bakery pan indexing feeder and a second inoperable position to expose a second roller member which collects the dough packets falling from the table,
   said second roller member having three rows of receptacles spaced apart from each other 120°, each receptacle sized to receive an individual substantially cylindrical shaped dough packet, and
   a drive mechanism for rotating the first and second roller members to rotate synchronously the first and second roller members through a 120° turn each time a row of dough packets is advanced.

2. The apparatus of claim 1 where the number of receptacles in the first and second roller members is equal to the number of spherical shaped dough packets in a single row of dough packets being advanced by the dough packet feeder.

3. The apparatus of claim 1 where the first roller member comprises a plurality of individual sections manually moveable laterally, each section having three receptacles therein each spaced apart from each other 120°.

4. Apparatus for manufacturing different shaped bakery products, including
   a dough packet feeder which advances to an exit station rows of dough packets having a first shape,
   a roller gate positioned at the exit station to receive the rows of dough packets exiting the dough packet feeder,
   said roller gate including a first roller member having three rows of receptacles spaced apart from each other 120° and each receptacle sized to receive an individual dough packet having said first shape,
   a bakery pan indexing feeder which advances in a stepwise manner bakery pans,
   a moving carrier member positioned between the roller gate and the bakery pan indexing feeder and having a receiving end onto which the rows of dough packets are deposited after leaving the roller gate and an exit end where the dough packets leave the moving carrier member,
   a moveable pressure mechanism which is selectably moved into position adjacent the moving carrier member to form the dough packets into a second shape, and
   a ramp member moveable between a first position at the exit end of the moving carrier member where said ramp member directs the dough packets leaving the carrier member into bakery pans carried by the bakery pan indexing feeder and a second position to expose a second roller member which collects the dough packets having a second shape as said second shaped dough packets leave the carrier member, said second roller member having three rows of receptacles spaced apart from each other 120°, each receptacle sized to receive an individual second shaped dough packet, and said first and second roller members being rotated through a 120° turn each time a row of dough packets is being advanced.

5. The apparatus of claim 4 including a drive mechanism for driving the first and second roller members synchronously in a step-wise manner.

6. The apparatus of claim 5 where the number of receptacles in the first and second roller members is equal to the number of first shaped dough packets in a single row of dough packets being advanced by the dough packet feeder.

7. The apparatus of claim 6 where the first roller member comprises a plurality of individual sections manually moveable laterally, each section having three receptacles therein each spaced apart from each other 120°.

* * * * *